(12) United States Patent
Iijima et al.

(10) Patent No.: US 11,296,896 B2
(45) Date of Patent: Apr. 5, 2022

(54) METHOD OF AUTHENTICATING AUTHENTICATION-TARGET APPARATUS USING CHALLENGE AND RESPONSE

(71) Applicant: CANON KABUSHIKI KAISHA, Tokyo (JP)

(72) Inventors: Ichiro Iijima, Yokohama (JP); Kenjiro Hori, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 302 days.

(21) Appl. No.: 16/361,535

(22) Filed: Mar. 22, 2019

(65) Prior Publication Data
US 2019/0305969 A1    Oct. 3, 2019

(30) Foreign Application Priority Data

Mar. 30, 2018  (JP) .............................. JP2018-069172
Mar. 7, 2019   (JP) .............................. JP2019-042005

(51) Int. Cl.
| | |
|---|---|
| H04L 9/32 | (2006.01) |
| H04L 9/08 | (2006.01) |
| H04L 9/14 | (2006.01) |
| G06F 3/12 | (2006.01) |
| G06F 16/22 | (2019.01) |

(52) U.S. Cl.
CPC .......... H04L 9/3271 (2013.01); G06F 3/1222 (2013.01); G06F 16/2282 (2019.01); H04L 9/0894 (2013.01); H04L 9/14 (2013.01); H04L 9/3226 (2013.01); H04L 9/3242 (2013.01)

(58) Field of Classification Search
None
See application file for complete search history.

(56) References Cited

U.S. PATENT DOCUMENTS

| | | | | |
|---|---|---|---|---|
| 2007/0156587 A1* | 7/2007 | Yu | ........................... | G06F 21/10 |
| | | | | 705/50 |
| 2013/0057861 A1* | 3/2013 | Ishii | ....................... | G01N 21/21 |
| | | | | 356/369 |
| 2014/0037089 A1* | 2/2014 | Itoh | ......................... | H04L 9/004 |
| | | | | 380/46 |

(Continued)

FOREIGN PATENT DOCUMENTS

JP    2017-143437 A    8/2017

OTHER PUBLICATIONS

Copending, Unpublished U.S. Appl. No. 16/155,958, to Hirotaka Ittogi, et al., filed Oct. 10, 2018.

Primary Examiner — Taghi T Arani
Assistant Examiner — Joshua Raymond White
(74) Attorney, Agent, or Firm — Venable LLP

(57) ABSTRACT

A target sends ID of a key table. The apparatus receives the ID. The apparatus sends ID of an authentication table to the target. The apparatus sends a challenge corresponding to a pair of the ID of the key table and the ID of the authentication table, to the target. The target obtains, from the key table, a key corresponding to a pair of the ID of the key table and the ID of the authentication table. The target generates a response from the challenge and the key. The target sends the response to the apparatus. The apparatus obtains, from the authentication table, a response corresponding to a pair of the ID of the key table and the ID of the authentication table. The apparatus authenticates the target based on the responses.

7 Claims, 13 Drawing Sheets

(56) References Cited

U.S. PATENT DOCUMENTS

| | | | |
|---|---|---|---|
| 2014/0173280 A1* | 6/2014 | Bunker | H04L 9/3271 713/168 |
| 2016/0191497 A1* | 6/2016 | Pietikainen | H04L 63/083 726/6 |
| 2017/0230540 A1 | 8/2017 | Sasaki | |
| 2018/0316512 A1* | 11/2018 | Wittenauer | H04L 9/3271 |

\* cited by examiner

FIG. 3B

AUTHENTICATION TABLE 208-1

| AUTHENTICATION TABLE ID=1 | KEY TABLE ID | | | | |
|---|---|---|---|---|---|
| | 1 | 2 | ... | i | n |
| | CHALLENGE(1,1) | CHALLENGE(2,1) | ... | CHALLENGE(i,1) | CHALLENGE(n,1) |
| | RESPONSE(1,1) | RESPONSE(2,1) | ... | RESPONSE(i,1) | RESPONSE(n,1) |

⋮

AUTHENTICATION TABLE 208-j

| AUTHENTICATION TABLE ID=j | KEY TABLE ID | | | | |
|---|---|---|---|---|---|
| | 1 | 2 | ... | i | n |
| | CHALLENGE(1,j) | CHALLENGE(2,j) | ... | CHALLENGE(i,j) | CHALLENGE(n,j) |
| | RESPONSE(1,j) | RESPONSE(2,j) | ... | RESPONSE(i,j) | RESPONSE(n,j) |

⋮

AUTHENTICATION TABLE 208-m

| AUTHENTICATION TABLE ID=m | KEY TABLE ID | | | | |
|---|---|---|---|---|---|
| | 1 | 2 | ... | i | n |
| | CHALLENGE(1,m) | CHALLENGE(2,m) | ... | CHALLENGE(i,m) | CHALLENGE(n,m) |
| | RESPONSE(1,m) | RESPONSE(2,m) | ... | RESPONSE(i,m) | RESPONSE(n,m) |

F I G. 4
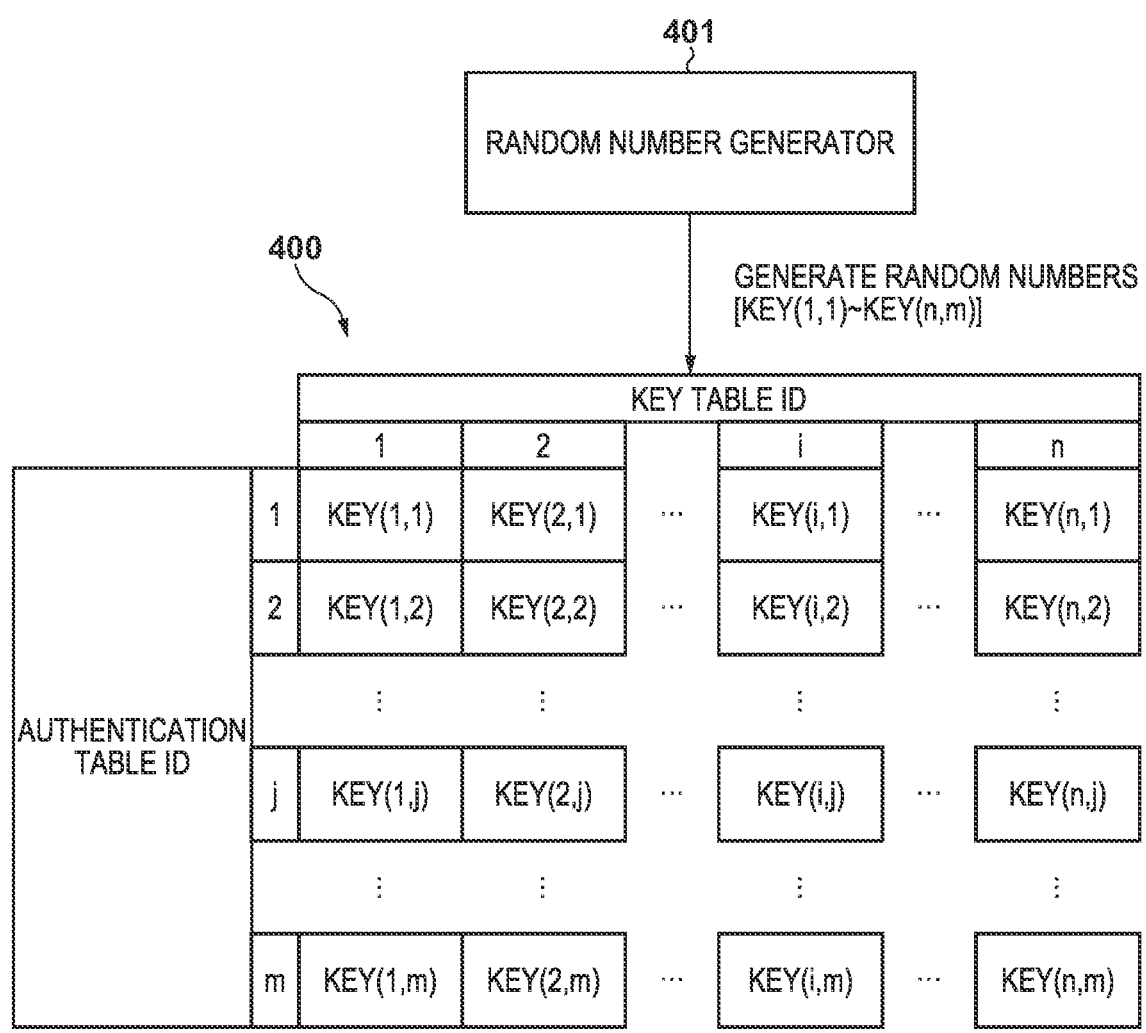

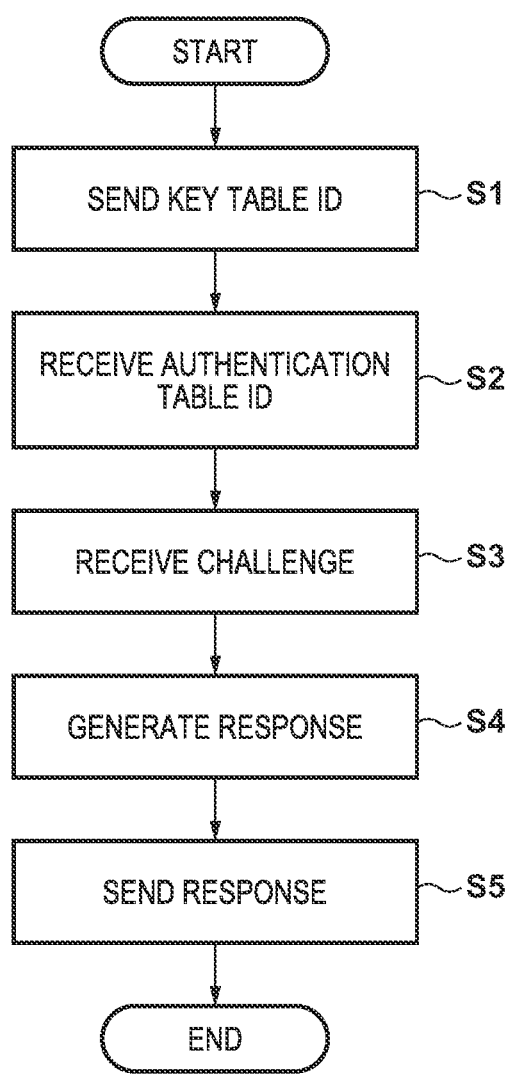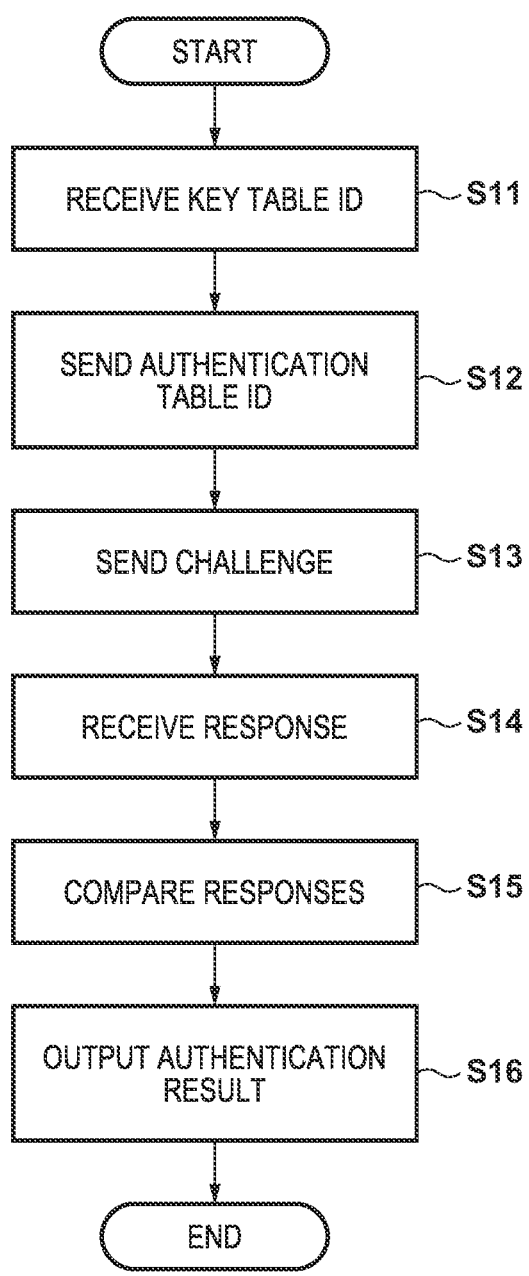

FIG. 8B

AUTHENTICATION TABLE ID=1 (208'-1)

| | 1 | 2 | ... | i | ... | n |
|---|---|---|---|---|---|---|
| | CHALLENGE(1,1) | CHALLENGE(2,1) | ... | CHALLENGE(i,1) | ... | CHALLENGE(n,1) |
| KEY TABLE ID | RESPONSE(1,1) | RESPONSE(2,1) | ... | RESPONSE(i,1) | ... | RESPONSE(n,1) |
| | PASSWORD(1,1) | PASSWORD(2,1) | ... | PASSWORD(i,1) | ... | PASSWORD(n,1) |

⋮

AUTHENTICATION TABLE ID=j (208'-j)

| | 1 | 2 | ... | i | ... | n |
|---|---|---|---|---|---|---|
| | CHALLENGE(1,j) | CHALLENGE(2,j) | ... | CHALLENGE(i,j) | ... | CHALLENGE(n,j) |
| KEY TABLE ID | RESPONSE(1,j) | RESPONSE(2,j) | ... | RESPONSE(i,j) | ... | RESPONSE(n,j) |
| | PASSWORD(1,j) | PASSWORD(2,j) | ... | PASSWORD(i,j) | ... | PASSWORD(n,j) |

⋮

AUTHENTICATION TABLE ID=m (208'-m)

| | 1 | 2 | ... | i | ... | n |
|---|---|---|---|---|---|---|
| | CHALLENGE(1,m) | CHALLENGE(2,m) | ... | CHALLENGE(i,m) | ... | CHALLENGE(n,m) |
| KEY TABLE ID | RESPONSE(1,m) | RESPONSE(2,m) | ... | RESPONSE(i,m) | ... | RESPONSE(n,m) |
| | PASSWORD(1,m) | PASSWORD(2,m) | ... | PASSWORD(i,m) | ... | PASSWORD(n,m) |

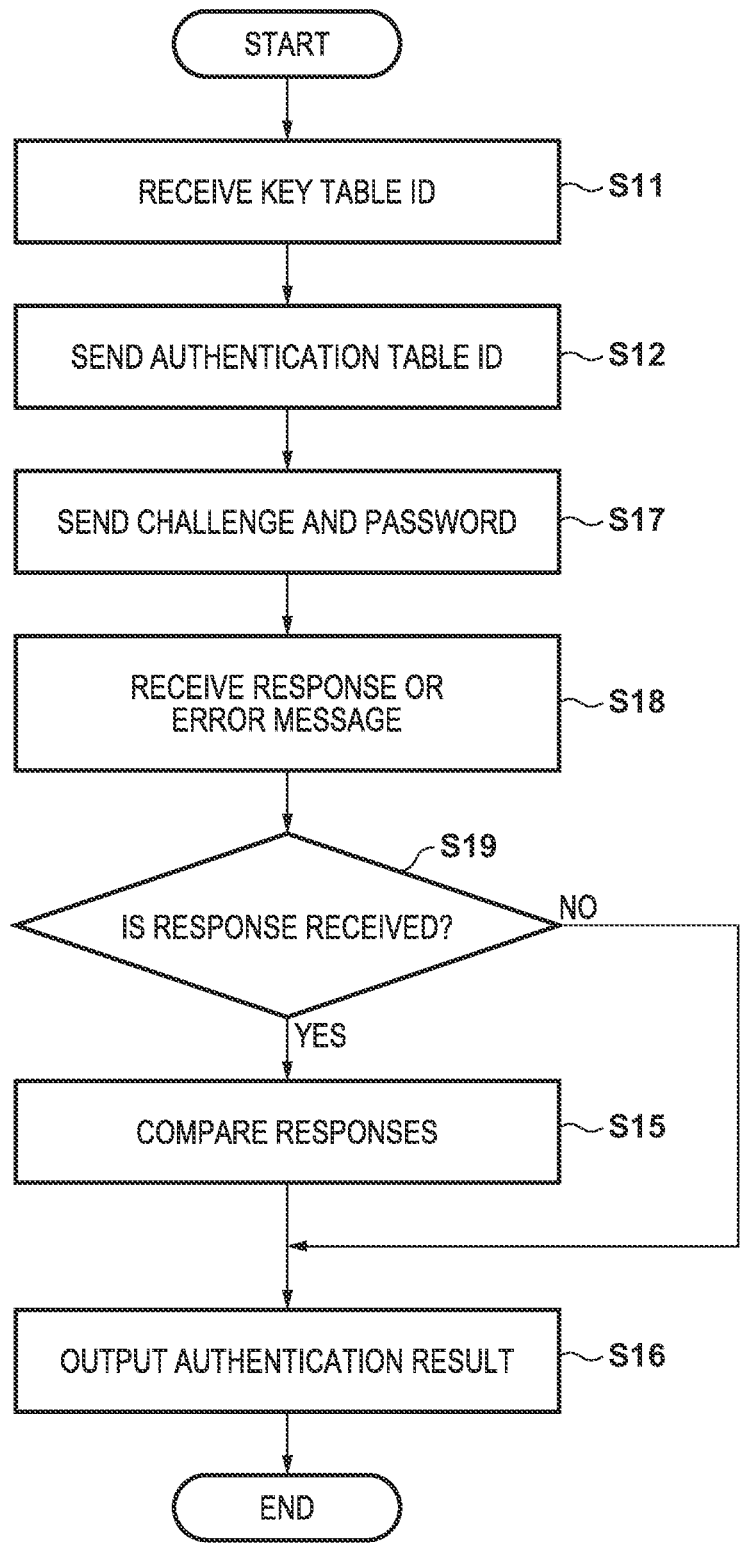

ns of the author
METHOD OF AUTHENTICATING AUTHENTICATION-TARGET APPARATUS USING CHALLENGE AND RESPONSE

BACKGROUND OF THE INVENTION

Field of the Invention

The present invention relates to a method of authenticating an authentication-target apparatus using a challenge and a response.

Description of the Related Art

A printer can keep a certain image quality by being appropriately maintained. The maintenance includes, for example, replacing consumable parts or replacement parts on a regular basis. However, the printer may malfunction if a consumable part or a replacement part is an imitation good that is not a genuine product. Something that is not a genuine product is, for example, a consumable part or a replacement part for a printer of a different type. In addition, by adding an optional device such as a feeder or a sheet discharge apparatus to a printer, user convenience improves. However, the printer may malfunction if an optional device is an imitation good that is not a genuine product. Accordingly, it is important to determine whether a device that is connected to the printer is a genuine product. Japanese Patent Laid-Open No. 2017-143437 recites validating whether a process cartridge that is attached to an image forming apparatus is a genuine product by authenticating the process cartridge.

To determine whether a device attached to an image forming apparatus is a genuine product, there is a method that uses shared key encryption, a method that uses a cryptographic hash function, or the like. In particular, a challenge-response authentication method that uses shared key encryption has spread. An authentication apparatus generates random number data (a challenge), and then sends it to an authentication-target apparatus. The authentication-target apparatus generates encryption data (a response) by encrypting the challenge by a shared key, and returns the response to the authentication apparatus. The authentication apparatus authenticates the authentication-target apparatus based on whether the received response matches a response obtained by encrypting the challenge by the shared key. In this way, challenge-response authentication is premised upon the authentication apparatus and the authentication-target apparatus holding the shared key. It is important that the shared key cannot be stolen by an attacker. The authentication apparatus and the authentication-target apparatus execute authentication processing while storing the shared key in a tamper-resistant chip that is highly secure, as with a secure LSI. However, if either of the authentication apparatus or the authentication-target apparatus is analyzed and the shared key is exposed, copying of the genuine product will become possible.

SUMMARY OF THE INVENTION

The present invention provides a method of authenticating an authentication-target apparatus by an authentication apparatus. The authentication-target apparatus sends identification information of a key table stored by the authentication-target apparatus to the authentication apparatus. The authentication apparatus receives the identification information of the key table from the authentication-target apparatus. The authentication apparatus sends identification information of an authentication table stored by the authentication apparatus to the authentication-target apparatus. The authentication-target apparatus receives the identification information of the authentication table. The authentication apparatus sends, to the authentication-target apparatus, a challenge corresponding to a pair of the identification information of the key table received from the authentication-target apparatus and the identification information of the authentication table stored by the authentication apparatus. The authentication-target apparatus receives the challenge from the authentication apparatus. The authentication-target apparatus obtains, from the key table stored by the authentication-target apparatus, a key corresponding to a pair of the identification information of the key table and the identification information of the authentication table stored by the authentication apparatus. The authentication-target apparatus generates a response from the challenge and the key obtained from the key table. The authentication-target apparatus sends the response to the authentication apparatus. The authentication apparatus receives the response from the authentication-target apparatus. The authentication apparatus obtains, from the authentication table, a response corresponding to a pair of the identification information of the key table received from the authentication-target apparatus and the identification information of the authentication table stored by the authentication apparatus. The authentication apparatus authenticates the authentication-target apparatus based on the response received from the authentication-target apparatus and the response obtained from the authentication table.

Further features of the present invention will become apparent from the following description of exemplary embodiments (with reference to the attached drawings).

BRIEF DESCRIPTION OF THE DRAWINGS

FIG. 3B illustrates authentication tables.

FIG. 4 is a view for describing a method of generating keys.

FIG. 7A is a flowchart for describing an authentication method.

FIG. 7B is a flowchart for describing an authentication method.

FIG. 8B illustrates authentication tables.

FIG. 10 is a flowchart for describing an authentication method.

DESCRIPTION OF THE EMBODIMENTS

First Embodiment

[Image Forming Apparatus (Authentication System)]

Figure 1A:
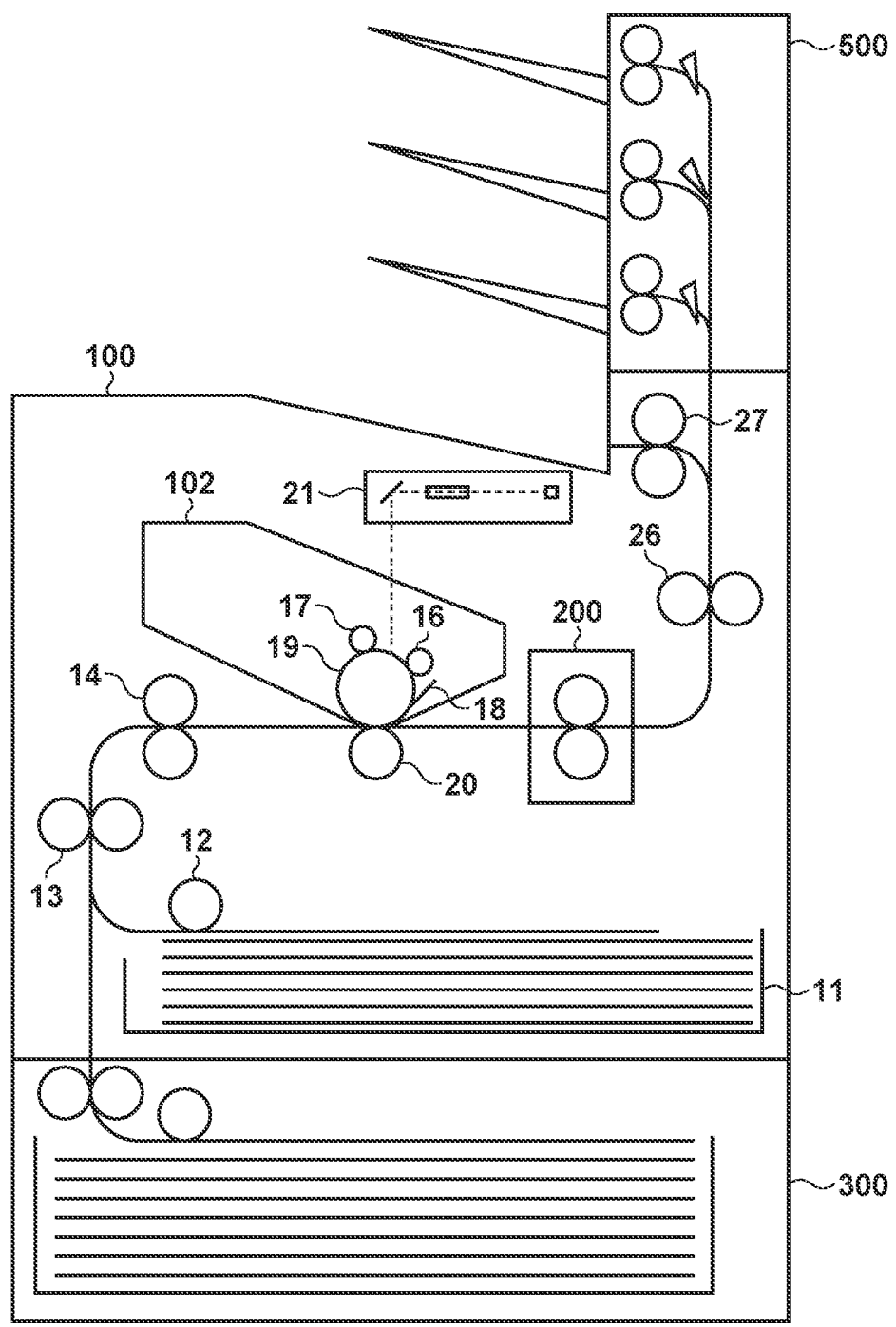
FIG. 1A illustrates an overview configuration of an image forming apparatus.

FIG. 1A illustrates an overall configuration of an image forming apparatus 100, an optional sheet feeding apparatus 300, and an optional sheet discharge apparatus 500. The image forming apparatus 100 is, for example, a printer, a copying machine, or a multi-function peripheral that forms an image on a sheet in accordance with an electrophotographic process. A sheet feeding unit 12 supplies a sheet stacked in a sheet stacking unit 11 to conveyance rollers 13 and 14. The conveyance rollers 13 and 14 conveys the sheet to a transfer nip portion. A transfer roller 20 forms the transfer nip portion with a photosensitive drum 19. A charging roller 16 uniformly charges a surface of the photosensitive drum 19. An exposure unit 21 forms an electrostatic latent image by emitting light onto the surface of the photosensitive drum 19. A development roller 17 uses toner to develop the electrostatic latent image to form a toner image on the surface of the photosensitive drum 19. By conveying the sheet while it is pinched by the transfer roller 20 and the photosensitive drum 19, the toner image formed on the photosensitive drum 19 is transferred to the sheet. A cleaner 18 cleans toner remaining on the photosensitive drum 19. A fixing device 200 fixes the toner image to the sheet. Conveyance rollers 26 and discharge rollers 27 convey the sheet that has passed through the fixing device 200, and discharge it to the outside of the image forming apparatus 100 or to the optional sheet discharge apparatus 500. A process cartridge 102 is configured by integration of the photosensitive drum 19, the charging roller 16, the development roller 17, and the cleaner 18, and is a replacement part that can be detached from the image forming apparatus 100. The fixing device 200 is also a replacement part that can be detached from the image forming apparatus 100.

The optional sheet feeding apparatus 300 is provided in order to increase a number of stacked sheets, and can be detached from the image forming apparatus 100. The optional sheet discharge apparatus 500 is an apparatus for discharging a sheet, on which an image has been formed, by sorting it into one of a plurality of discharge trays. The optional sheet discharge apparatus 500 can also be detached from the image forming apparatus 100.

Figure 1B:
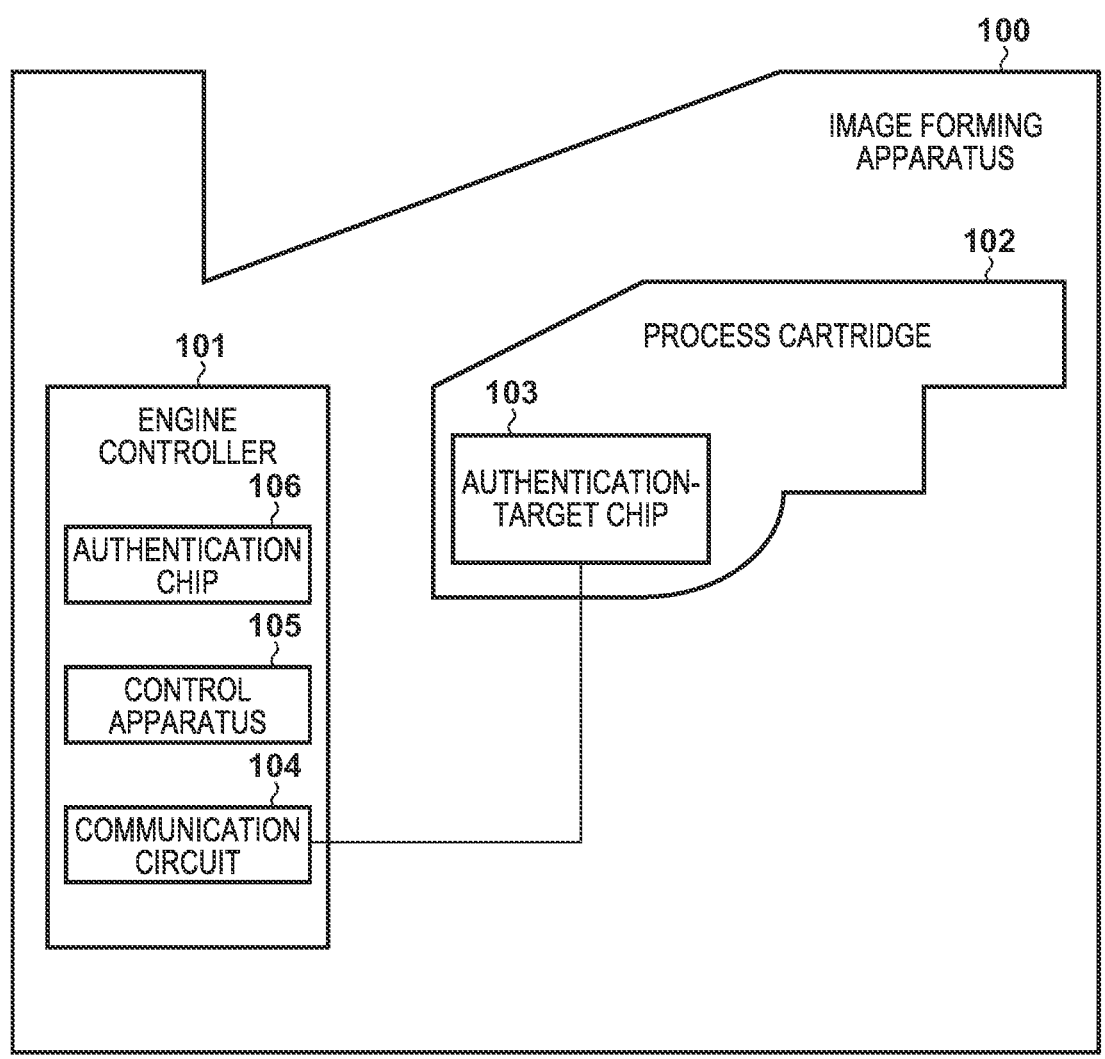
FIG. 1B illustrates an image forming apparatus which is an example of an authentication system.
Figure 2:
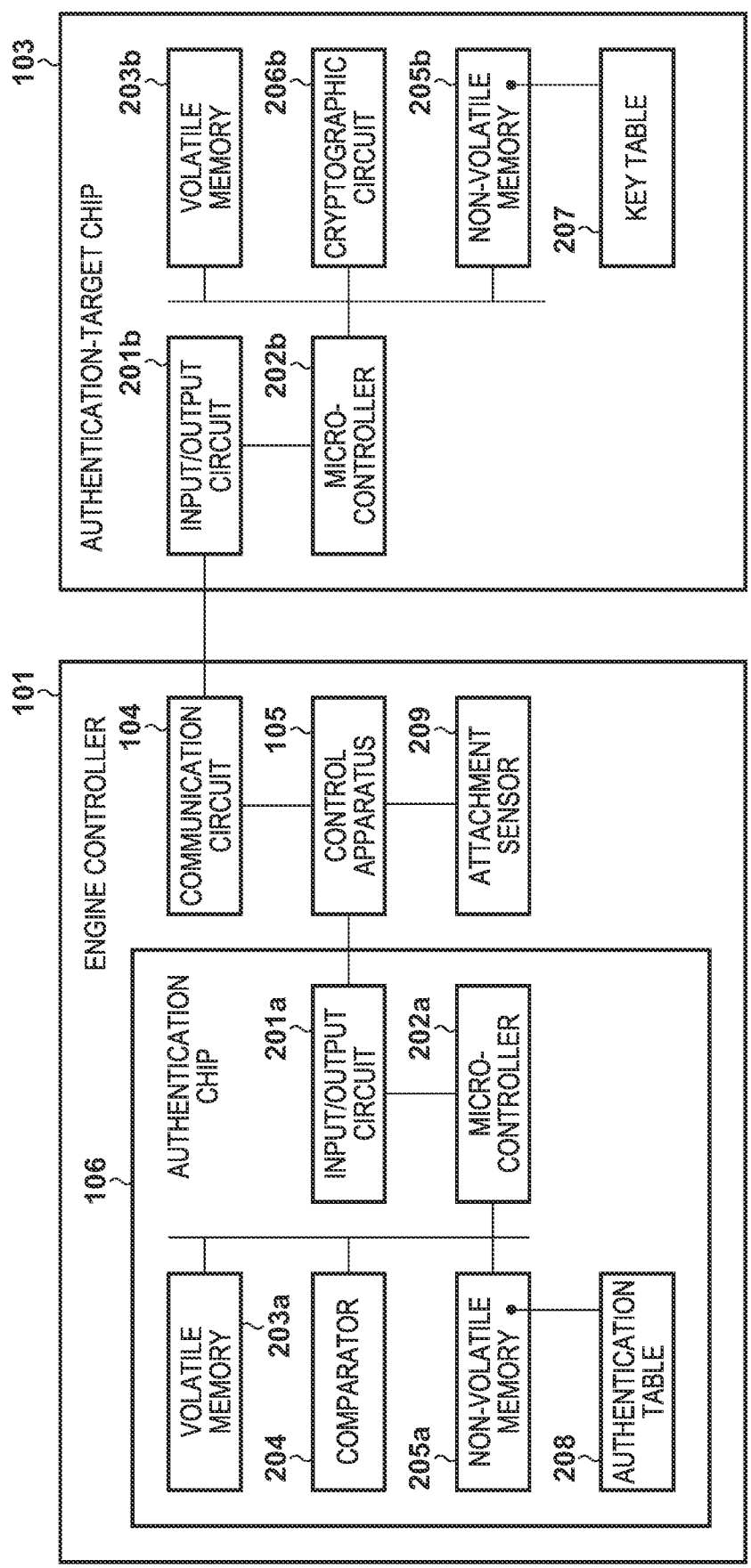
FIG. 2 is a view for describing an authentication-target chip and an engine controller.

FIG. 1B illustrates the process cartridge 102 in which an authentication-target chip 103 is provided. An engine controller 101 has a control apparatus 105, an authentication chip 106, and a communication circuit 104. The control apparatus 105 is a controller that comprehensively controls the entirety of the image forming apparatus 100. The authentication chip 106 is a semiconductor integrated circuit for authenticating the authentication-target chip 103. The communication circuit 104 is a communication circuit for communicating with the process cartridge 102. The process cartridge 102 is a replacement part that can be detached from the main body of the image forming apparatus 100, and has the photosensitive drum 19, the development roller 17, and the like. The process cartridge 102 has the authentication-target chip 103. The authentication-target chip 103 is a tamper-resistant chip. Upon using an attachment sensor 209 to detect that the process cartridge 102 is attached, the control apparatus 105 instructs the authentication chip 106 to authenticate the process cartridge 102. The control apparatus 105 sends a challenge generated by the authentication chip 106 to the authentication-target chip 103, via the communication circuit 104. The control apparatus 105 transfers a response received from the authentication-target chip 103 to the authentication chip 106, via the communication circuit 104. The control apparatus 105 accepts an authentication result from the authentication chip 106. The authentication-target chip 103 may be embedded in a replacement part (the fixing device 200), an optional device (the optional sheet feeding apparatus 300, the optional sheet discharge apparatus 500, or the like), or a consumable part of the image forming apparatus 100. FIG. 2 illustrates an internal configuration of the engine controller 101 and the authentication-target chip 103. The authentication chip 106 has an input/output circuit 201a, a microcontroller 202a, a volatile memory 203a, a comparator 204, and a non-volatile memory 205a. The input/output circuit 201a receives, for example, a command outputted from the control apparatus 105, and transfers it to the microcontroller 202a. The input/output circuit 201a transfers response data from the microcontroller 202a to the control apparatus 105. The microcontroller 202a is a processor circuit for performing internal processing in accordance with a command received from the control apparatus 105. A program for performing control of the authentication chip 106 and the authentication table 208 are written to the non-volatile memory 205a. The volatile memory 203a stores temporary data when the microcontroller 202a performs data processing. The comparator 204 is a circuit for comparing two pieces of inputted data, determining whether the two pieces of data are equal or different, and outputting a determination result.

An input/output circuit 201b is electrically connected to the communication circuit 104 when the process cartridge 102 is attached to the main body of the image forming apparatus 100. Via the communication circuit 104, the input/output circuit 201b receives a command or a challenge sent from the control apparatus 105, and outputs it to a microcontroller 202b. Via the communication circuit 104, the input/output circuit 201b receives the response outputted from the microcontroller 202b, and outputs it to the microcontroller 202a. The microcontroller 202b is a processor circuit for performing internal processing in accordance with a command from the control apparatus 105. A key table 207 and a program for controlling the authentication-target chip 103 are written to a non-volatile memory 205b. A volatile memory 203b is a memory for storing temporary data when the microcontroller 202b performs data processing. A cryptographic circuit 206b executes an encryption calculation for authentication processing, in accordance with an instruction by the microcontroller 202b.

A starting point of the authentication processing is the control apparatus 105. The control apparatus 105 outputs various commands necessary for the authentication processing to the authentication chip 106 and the authentication-target chip 103. The authentication chip 106 and the authentication-target chip 103 execute processing in accordance with respective commands, and returns to the control apparatus 105 an execution result as a response to the command.

[Key Tables and Authentication Tables]

Figure 3A:
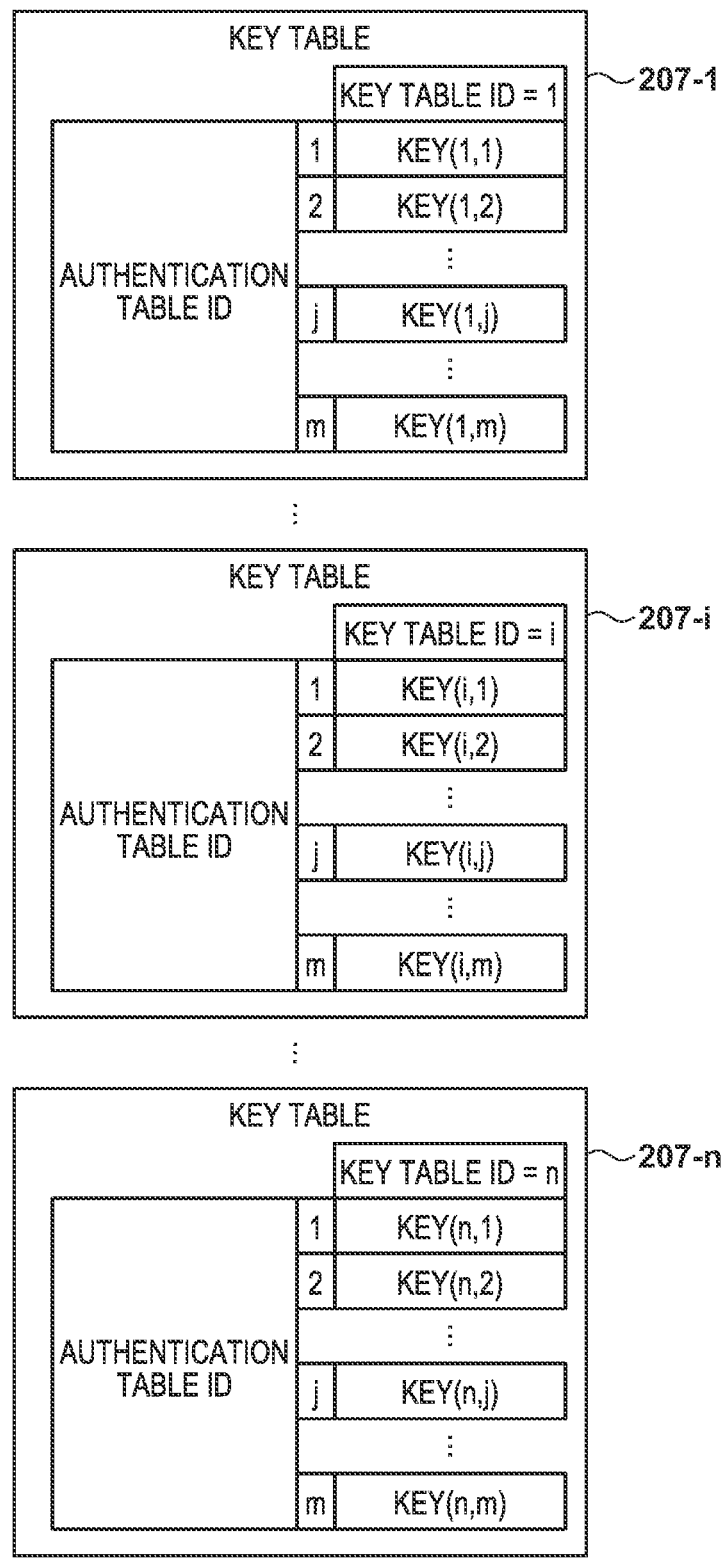
FIG. 3A illustrates key tables.

FIG. 3A illustrates key tables 207-1 through 207-$n$ that store keys used in authentication. One key table 207 out of the key tables 207-1 through 207-$n$ is written to the non-volatile memory 205b of the authentication-target chip 103. FIG. 3B illustrates authentication tables 208-1 through 208-$m$. One authentication table 208 out of the authentication tables 208-1 through 208-$m$ is written to the non-volatile memory 205a of the authentication chip 106.

As illustrated by FIG. 3A, there are a plurality (a limited number) of key tables 207, and identification information (a key table ID) is appended to each key table 207. Similarly, there are a plurality (a limited number) of authentication tables 208, and identification information (an authentication table ID) is appended to each authentication table 208. Here, the number of key table IDs is n. Here, the number of authentication table IDs is m. In one key table 207, m keys (where m is the same as the number of authentication table IDs) are written in association with the authentication table IDs. The keys that are written to each key table 207 differ for each key table ID. In other words, a key written to a key table 207 to which a certain key table ID has been appended is different to a key written to a key table 207 to which a different key table ID has been appended.

In FIG. 3A, a variable i that indicates a key table ID takes any value from 1 to n. In addition, a variable j that indicates an authentication table ID takes any value from 1 to m. From the plurality of keys written to a key table 207-$i$ for which the key table ID=i, a key that corresponds to where the authentication table ID=j is represented as a key(i, j).

The same number n of challenge/response pairs as the number of key tables 207 are written to an authentication table 208, in association with a key table ID. The challenge/response pairs that are written differ for each authentication table 208. The plurality of pairs written to one authentication table 208 differ from the plurality of pairs written to another authentication table 208. There are a plurality of challenges and responses written to an authentication table 208-$j$ for where the authentication table ID=j, and the challenge and response corresponding to where the key table ID=i are respectively represented as the challenge(i, j) and the response(i, j). The challenge(i, j) and the response(i, j) form one pair.

[Generation of Key, Challenge, and Response]

FIG. 4 is a view for describing a method of generating keys. A random number generator 401 generates a key (1, 1) to a key (n, m). The random number generator 401 is a circuit that is external to the authentication system. In FIG. 4, rows correspond to authentication table IDs, and columns correspond to key table IDs. Such a key group may be referred to as a key matrix 400. The key matrix 400 stores n×m keys.

Figure 5:
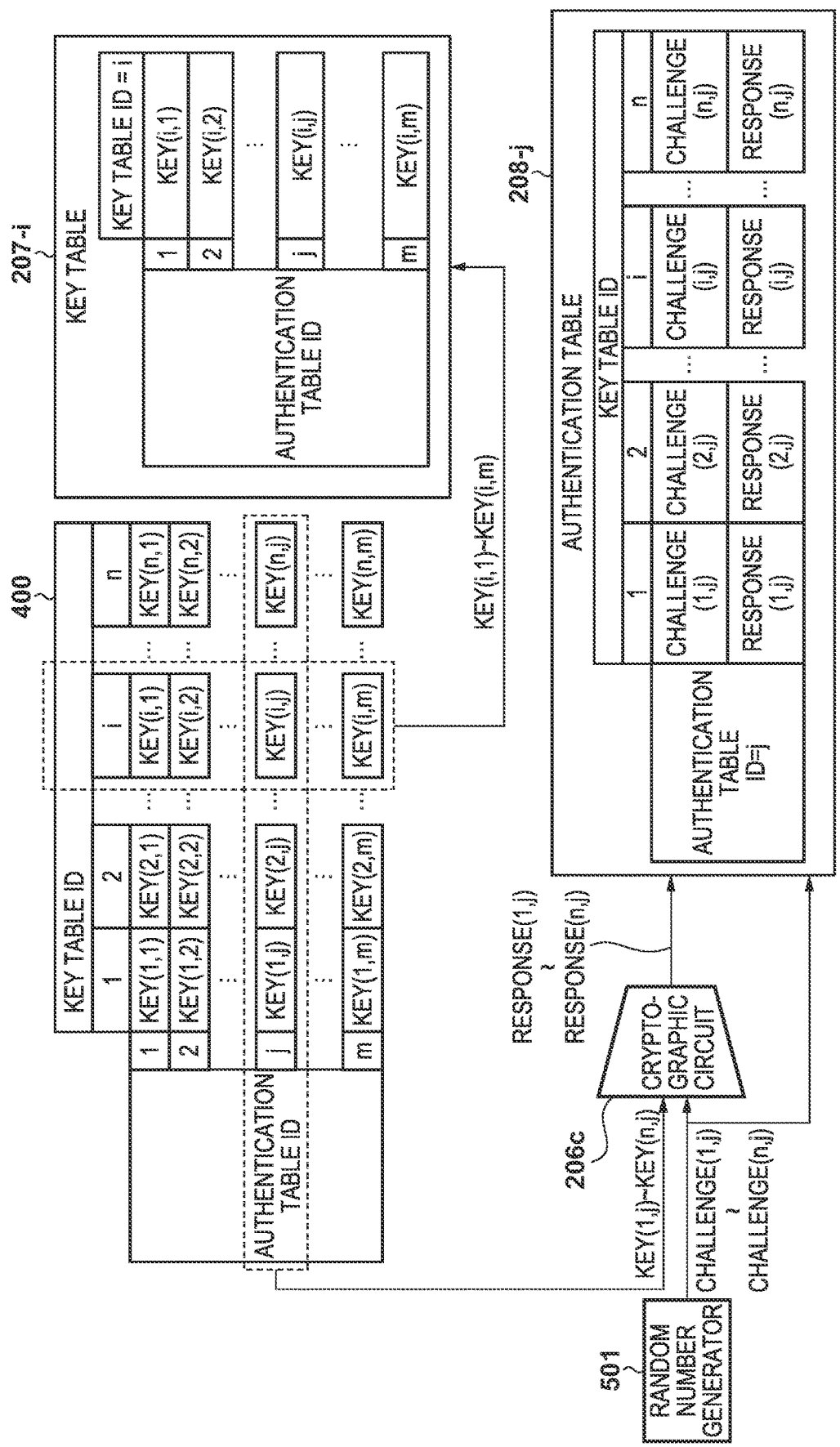
FIG. 5 is a view for describing a method of generating a key table and an authentication table.

FIG. 5 is a view for describing a method of generating pairs of a challenge and a response. As illustrated by FIG. 5, m keys that are stored in columns corresponding to a key table ID are saved in a key table 207 to which the key table ID has been appended. For example, m keys(i, 1) to (i, m) that are stored in the i-th column are saved in a key table 207-$i$ to which i has been appended as the key table ID.

To generate the authentication table 208-$j$ for where the authentication table ID=j, the keys(1, j) through (n, j) stored in the j-th row of the key matrix are obtained one at a time, and supplied to a cryptographic circuit 206$c$. A random number generator 501 generates challenges(1, j) through (n, j) and supplies them one at a time to the cryptographic circuit 206$c$. The cryptographic circuit 206$c$ uses the key(i, j) and the challenge(i, j) to generate the response(i, j). i takes values from 1 to n. By this, the responses(1, j) to (n, j) are generated. As illustrated by FIG. 5, pairs of the challenge(i, j) and the response(i, j) are saved in the authentication table 208-$j$. Ultimately, n pairs are written to the authentication table 208-$j$.

The cryptographic circuit 206$c$ is a cryptographic circuit that performs the same processing as that of the cryptographic circuit 206$b$ which is provided in the authentication-target chip 103. If the same key and the same challenge are inputted to each of the cryptographic circuit 206$b$ and the cryptographic circuit 206$c$, the cryptographic circuit 206$b$ and the cryptographic circuit 206$c$ each output the same output data (response).

Note that the suffixes i and j for the challenge and response respectively indicate the key table ID and the authentication table ID corresponding to the key used to generate the response. The same authentication table ID may be appended to a plurality of authentication tables. In such a case, the random number generator 501 may generate different challenges with respect to a plurality of authentication tables to which the same authentication table ID has been appended. For example, a challenge(1, j) for one authentication table may be different to a challenge(1, j) for another authentication table. This is effective in differentiating authentication tables 208 among each authentication chip 106. For example, it is possible for all authentication chips 106 to each store a different authentication table 208. In addition, it is possible to write different pairs to all existing authentication tables 208, while limiting the number of authentication table ID. However, a plurality of key tables 207 that have the same key table ID must all have the same keys.

The cryptographic circuits 206$b$ and 206$c$ calculate a response by using a cryptographic hash function or a shared key encryption function, for example. As a cryptographic hash function, for example, SHA-256 which is standardized by NIST_FIPS_PUB 180-4 may be employed.

$$\text{Response}(i,j)=\text{SHA-256}(\text{key}(i,j)|\text{challenge}(i,j)) \quad (1)$$

Here "key(i, j)|challenge(i, j)" means concatenation the key(i, j) and the challenge(i, j). In other words, "|" is a concatenation operator. As a shared key encryption function, for example, AES which is standardized by NIST_FIPS_PUB 197 may be employed.

$$\text{Response}(i,j)=\text{AES}(\text{Key}=\text{key}(i,j),\text{Message}=\text{challenge}(i,j)) \quad (2)$$

A generated key table 207 is written to the non-volatile memory 205$b$ of the authentication-target chip 103 at a factory for manufacturing the process cartridge 102. A generated authentication table 208 is written to the non-volatile memory 205$a$ of the authentication chip 106 at a factory for manufacturing the engine controller 101.

[Authentication Sequence]

Figure 6B:
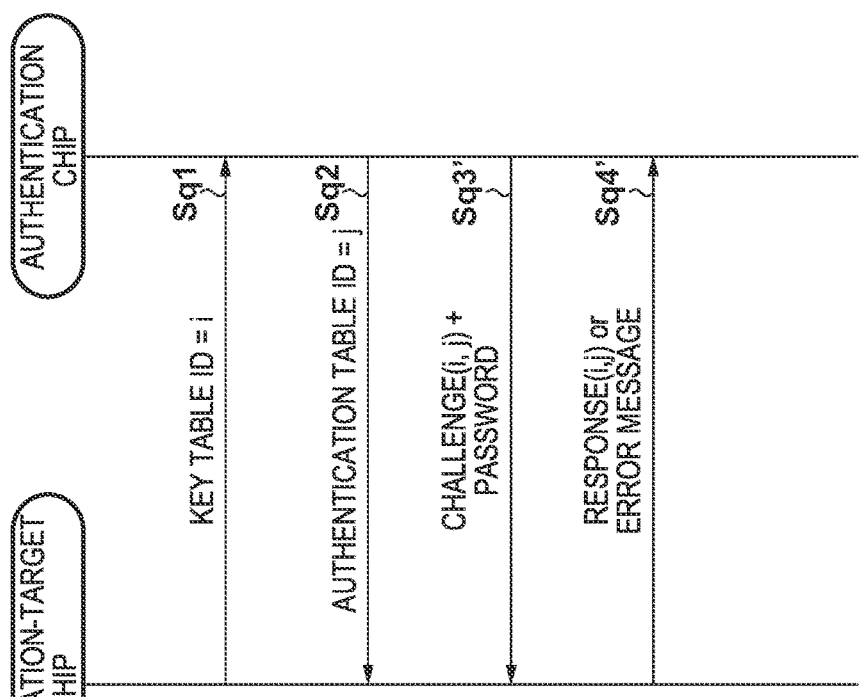
FIG. 6B is a sequence diagram that illustrates an authentication procedure.
Figure 6A:
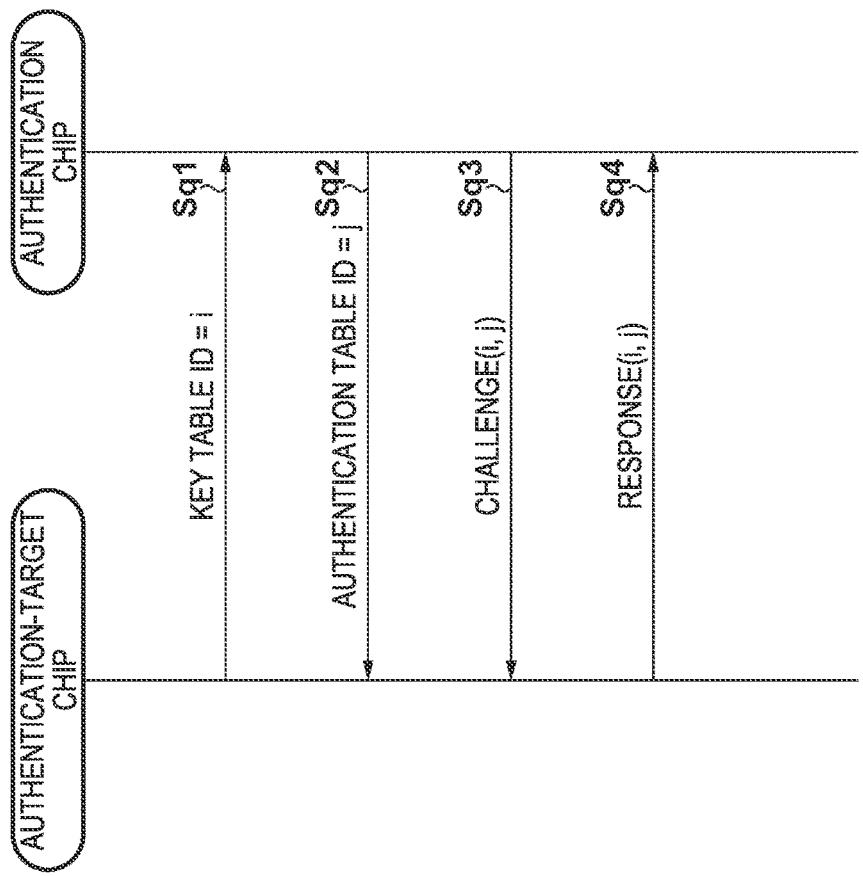
FIG. 6A is a sequence diagram that illustrates an authentication procedure.

FIG. 6A is a sequence diagram relating to an authentication method. FIG. 7A is a flowchart illustrating an authentication method that is executed by the authentication-target chip 103. FIG. 7B is a flowchart illustrating an authentication method that is executed by the authentication chip 106. Here, the authentication-target chip 103 stores a key table 207 to which i has been appended as the key table ID. In addition, the authentication chip 106 stores an authentication table 208 to which j has been appended as the authentication table ID.

At Sq1, the authentication-target chip 103 sends its own key table ID to the authentication chip 106.

In step S1, when an authentication start condition is satisfied, the microcontroller 202$b$ of the authentication-target chip 103 reads a key table ID from the non-volatile memory 205$b$ and sends the key table ID to the authentication chip 106 via the input/output circuit 201$b$. The authentication start condition is, for example, that the process cartridge 102 has been electrically connected to the main body of the image forming apparatus 100, that an authentication command is received from the authentication chip 106, or the like.

In step S11, the microcontroller 202a of the authentication chip 106 receives the key table ID from the authentication-target chip 103, via the communication circuit 104, the control apparatus 105, and the input/output circuit 201a.

At Sq2, the authentication chip 106 sends its own authentication table ID to the authentication-target chip 103.

In step S12, the microcontroller 202a of the authentication chip 106 reads the authentication table ID from the non-volatile memory 205a, and sends the authentication table ID to the authentication-target chip 103 via the input/output circuit 201a, the control apparatus 105, and the communication circuit 104.

In step S2, the microcontroller 202b of the authentication-target chip 103 receives the authentication table ID from the authentication chip 106.

At Sq3, the authentication chip 106 sends a challenge(i, j) to the authentication-target chip 103.

In step S13, the microcontroller 202a of the authentication chip 106 obtains, from an authentication table 208 of the non-volatile memory 205a, the challenge(i, j) which corresponds to the pair of the authentication table ID of the authentication chip 106 and the key table ID of the authentication-target chip 103. Furthermore, the microcontroller 202a sends the challenge(i, j) to the authentication-target chip 103 via the input/output circuit 201a, the control apparatus 105, and the communication circuit 104.

In step S3, the microcontroller 202b of the authentication-target chip 103 receives the challenge(i, j) from the authentication chip 106.

At Sq4, the authentication-target chip 103 sends the response(i, j) that corresponds to the challenge(i, j) to the authentication chip 106.

In step S4, the microcontroller 202b of the authentication-target chip 103 obtains, from the key table 207, a key(i, j) corresponding to a pair of the authentication table ID of the authentication chip 106 and the key table ID of the authentication-target chip 103. Furthermore, the microcontroller 202b supplies the key(i, j) and the challenge(i, j) to the cryptographic circuit 206b, and causes the cryptographic circuit 206b to generate the response(i, j).

In step S5, the microcontroller 202b sends the response(i, j) generated by the cryptographic circuit 206b to the authentication chip 106, via the input/output circuit 201b.

In step S14, the microcontroller 202a of the authentication chip 106 receives the response(i, j) from the authentication-target chip 103.

In step S15, the microcontroller 202a supplies the received the response(i, j) and the response(i, j) obtained from the authentication table 208 to the comparator 204, and causes the comparator 204 to compare them.

In step S16, the microcontroller 202a receives a comparison result from the comparator 204, generates an authentication result based on the comparison result, and outputs the authentication result to the control apparatus 105. If the received response(i, j) does not match the response(i, j) obtained from the authentication table 208, the authentication result is authentication failure. In contrast, if the received response(i, j) matches the response(i, j) obtained from the authentication table 208, the authentication result is authentication success. If the authentication result is authentication failure, the control apparatus 105 suspends image forming processing, and performs, on display unit (not shown) of the image forming apparatus, display for entrusting a user with a determination of whether or not to permit image formation. If the authentication result is authentication success, the control apparatus 105 permits image formation on the image forming apparatus 100.

Note that, if the authentication-target chip 103 is a genuine product, all keys are saved in the key table 207 of the non-volatile memory 205b are correct keys. Accordingly, the key(i, j) is also a correct key. The cryptographic circuit 206b has the same encryption algorithm as that of the cryptographic circuit 206c which is used to generate the authentication tables 208. Accordingly, the response(i, j) generated by the cryptographic circuit 206b and the response(i, j) stored in the authentication table 208 which is generated by the cryptographic circuit 206c match.

[Influence of an Attack]

Description is given regarding influence in a case where the authentication chip 106 and the authentication-target chip 103 are attacked by an analyst. If an attack target is the authentication chip 106, the authentication table 208 saved in the non-volatile memory 205a is a target for analysis. To enable authentication with every authentication chip 106, it is necessary to analyze all responses written to every authentication chip 106 that exists. However, every authentication table 208 written to an authentication chip 106 differs for every authentication chip 106. Accordingly, it is difficult in practice to collect every response.

If an attack target is the authentication-target chip 103, the key table 207 saved in the non-volatile memory 205b is targeted for analysis. A plurality of keys corresponding to a plurality of authentication tables 208 have been written to the non-volatile memory 205b. For example, assume that the key(i, j) has been exposed to an attacker. In this case, the key(i, j) is only effective for an authentication chip 106 that holds an authentication table 208 for where the authentication table ID=j.

As illustrated by FIG. 6A, after the authentication-target chip 103 sends a key table ID to the authentication chip 106, the authentication chip 106 sends an authentication table ID and a challenge. Accordingly, when the authentication-target chip 103 sends the key table ID to the authentication chip 106, the authentication table ID of the authentication chip 106 is still unclear. Accordingly, to realize alteration for all authentication table IDs, an attacker needs to expose all keys from one key table. There are cases where a destructive attack, which is an extreme analysis technique with respect to a tamper-resistant chip, is used. This is an attack that includes cutting or shaving of a chip. Accordingly, to expose a plurality of keys before the chip is completely broken is very difficult in comparison to exposing just one key.

By virtue of the first embodiment with such a configuration, the difficulty of analysis with respect to the authentication chip 106 and the authentication-target chip 103 increases in comparison to the past. In particular, analysis with respect to the authentication chip 106 becomes difficult to the extent that there ceases to be substantial meaning for such analysis.

Second Embodiment

An authentication system of the second embodiment is something that makes the authentication system of the first embodiment more secure. In the second embodiment, description in common with that of the first embodiment is omitted, and points of difference are described in detail.

FIG. 6B is a sequence diagram that illustrates an authentication method of the second embodiment. At Sq3 of FIG. 6A the challenge(i, j) is sent, but, at Sq3' of FIG. 6B, the authentication chip 106 sends a password to the authentication-target chip 103 in addition to the challenge(i, j). If the received password matches a password stored in the non-volatile memory 205b, the authentication-target chip 103 generates the response(i, j), and sends the response(i, j) at Sq4'. In contrast, if the received password does not match a password stored in the non-volatile memory 205b, the authentication-target chip 103 sends an error message at Sq4' without generating the response(i, j). In other words, the authentication processing is stopped.

Figure 8A:
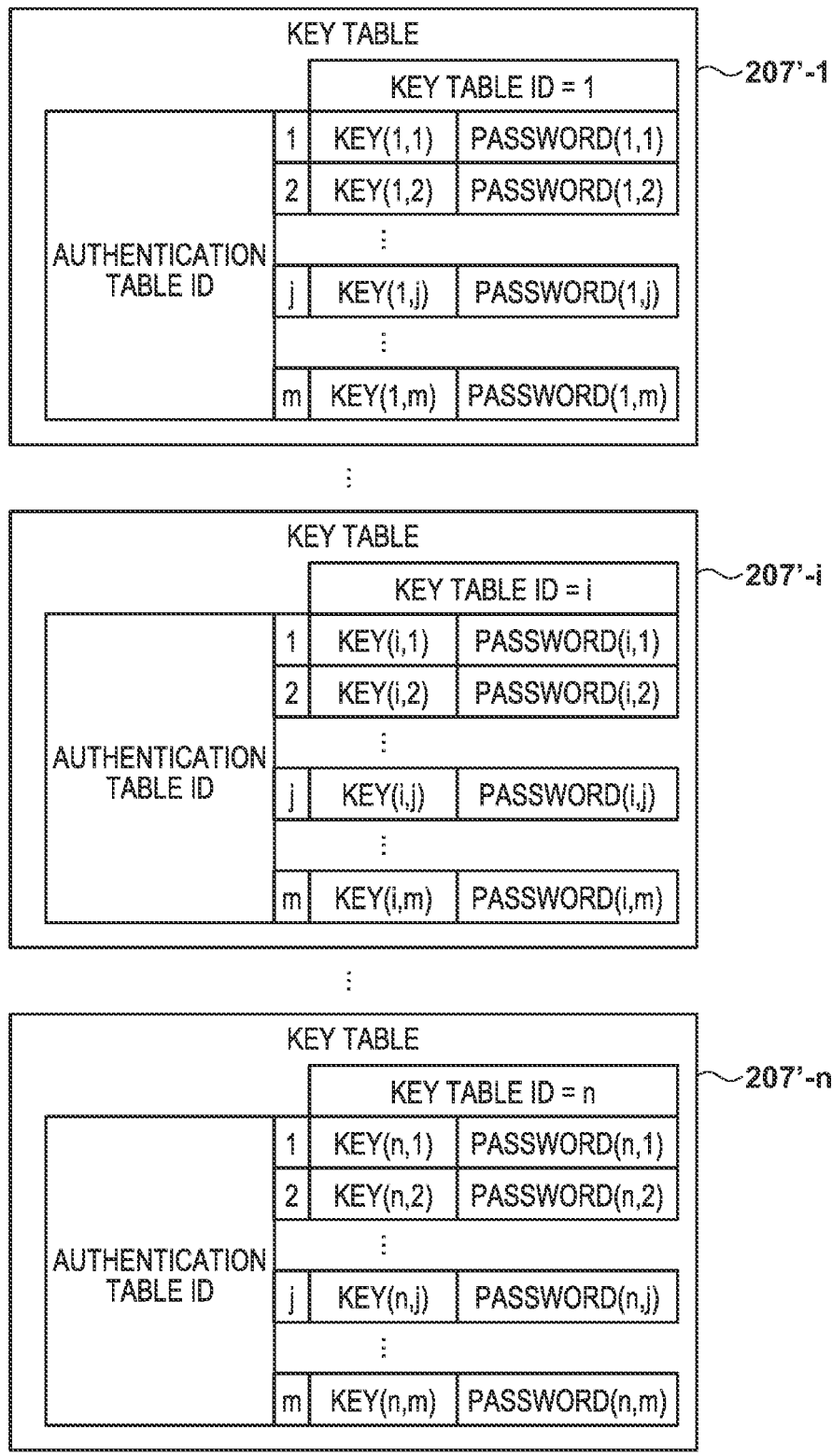
FIG. 8A illustrates key tables.

FIG. 8A illustrates key tables 207' of the second embodiment. FIG. 8B illustrates authentication tables 208' of the second embodiment. In comparison to the key tables 207 and the authentication tables 208 of the first embodiment, the key tables 207' and the authentication tables 208' of the second embodiment each have a password. A password is generated for each pair of a key table ID and an authentication table ID. A plurality of passwords corresponding to pairs of j (j is an integer from 1 to m) which is the authentication table ID and integers 1 to n which are all of the key table IDs are written to an authentication table 208'-j. The passwords that are written differ for each pair of a key table ID and an authentication table ID. Passwords corresponding to a pair of a key table ID and an authentication table ID are also written to every key table 207'. In other words, the passwords(i, j) stored in the key tables 207' match the passwords(i, j) stored in the authentication tables 208'. Passwords are generated by a random number generator, for example, and written to the key tables 207' and the authentication tables 208' in advance. An authentication table 208' is written to the non-volatile memory 205a of the authentication chip 106. A key table 207' is written to the non-volatile memory 205b of the authentication-target chip 103.

[Authentication Processing on Authentication-Target Chip]

Figure 9:
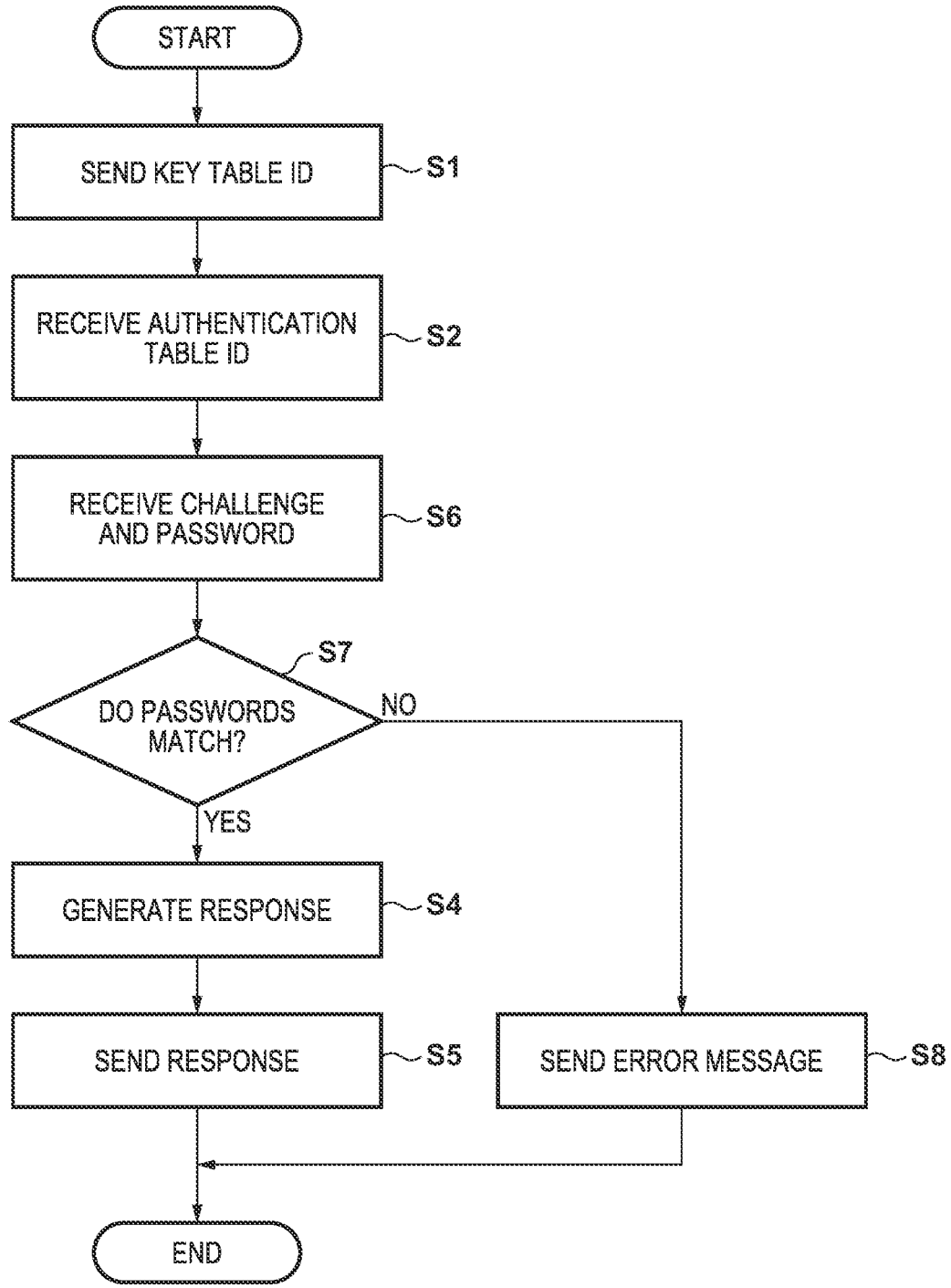
FIG. 9 is a flowchart for describing an authentication method.

FIG. 9 illustrates an authentication method that is executed by the authentication-target chip 103. Step S3 of the first embodiment is replaced by step S6, step S7, and step S8 in the second embodiment.

In step S6, the microcontroller 202b of the authentication-target chip 103 receives the challenge(i, j) and a password(i, j) from the authentication chip 106.

In step S7, the microcontroller 202b obtains, from the key table 207' of the non-volatile memory 205b, a password (i, j) corresponding to the pair(i, j) of its own key table ID and the authentication table ID of the authentication chip 106. Furthermore, the microcontroller 202b determines whether the password obtained from the key table 207' matches the received password(i, j). If both match, the microcontroller 202b proceeds to step S4. In other words, when these passwords match, a response is generated and sent. However, if both passwords do not match, the microcontroller 202b proceeds to step S8 without generating a response.

In step S8, the microcontroller 202b sends an error message to the authentication chip 106.

[Authentication Processing on Authentication Chip]

FIG. 10 illustrates an authentication method that is executed by the authentication chip 106. Step S13 and step S14 of the first embodiment are replaced by step S17, step S18, and step S19 in the second embodiment.

In step S17, the microcontroller 202a of the authentication chip 106 obtains, from the key table 207' of the non-volatile memory 205b, the challenge(i, j) and the password(i, j) corresponding to the pair(i, j) of the received key table ID and its own authentication table ID. Furthermore, the microcontroller 202a sends the password(i, j) and the challenge(i, j) to the authentication-target chip 103.

In step S18, the microcontroller 202a receives the response(i, j) or an error message from the authentication-target chip 103.

In step S19, the microcontroller 202a determines whether it has received the response(i, j) from the authentication-target chip 103. When the response(i, j) is received, the microcontroller 202a proceeds to step S15, and executes comparison processing for the response(i, j). However, when an error message is received, the microcontroller 202a proceeds to step S16, and outputs to the control apparatus 105 an authentication result which indicates authentication failure.

By virtue of the second embodiment, the security of the authentication system further improves in comparison to the first embodiment, because a password is used in addition to a challenge. It is very difficult to statically read data stored in a non-volatile memory that is a tamper-resistant chip. Because there is a password, it is more difficult to expose keys by dynamic access to the authentication-target chip 103. This is because a response is not generated if passwords do not match. In this way, for the second embodiment, difficulty of analysis with respect to the authentication-target chip 103 is higher than for the first embodiment.

SUMMARY

The authentication-target chip 103 is an example of an authentication-target apparatus which is authenticated by an authentication apparatus. The non-volatile memory 205b is an example of a storage circuit that stores a key table 207. The microcontroller 202b and the input/output circuit 201b are an example of a circuit for sending identification information (for example, a key table ID) of a key table stored by the storage circuit to the authentication apparatus. The microcontroller 202b and the input/output circuit 201b are an example of a circuit for receiving, from an authentication apparatus, identification information (for example, an authentication table ID) of an authentication table stored by the authentication apparatus. The microcontroller 202b and the input/output circuit 201b are an example of a circuit for receiving, from the authentication apparatus, a challenge corresponding to a pair of identification information of a key table and identification information of an authentication table. The microcontroller 202b is an example of a circuit for obtaining, from the key table 207, a key that corresponds to a pair of identification information of a key table and identification information of an authentication table. The cryptographic circuit 206b is an example of a circuit for generating a response from the key obtained from the key table 207 and the challenge received from the authentication apparatus. The microcontroller 202b and the input/output circuit 201b are an example of a circuit for sending the response to the authentication apparatus. In this way, after the identification information of the key table is sent, the identification information of the authentication table is sent. Accordingly, when the identification information of the key table is sent, the identification information of the authentication table is unclear. Accordingly, an attacker must expose all keys from one key table, and forgery of an authentication-target apparatus is more difficult that in the past. In particular, while the authentication-target apparatus stores keys, the authentication apparatus does not store keys. Accordingly, leakage of all keys from the authentication apparatus will not occur. In addition, while the authentication apparatus stores responses, the authentication-target apparatus does not store responses. Accordingly, leakage of all responses from the authentication-target apparatus will not occur. Accordingly, forgery of an authentication-target apparatus is more difficult that in the past.

The authentication chip 106 is an example of an authentication apparatus for authenticating an authentication-target apparatus. The microcontroller 202a and the input/output circuit 201a are an example of a circuit for receiving identification information of a key table from the authentication-target apparatus. The non-volatile memory 205a is an example of a storage circuit that stores an authentication table. The microcontroller 202a and the input/output circuit 201a are an example of a circuit for sending identification information of an authentication table stored by the storage circuit to the authentication-target apparatus. The microcontroller 202a is an example of a circuit for obtaining, from an authentication table, a challenge that corresponds to a pair of identification information of a key table that is received from an authentication-target apparatus, and identification information of the authentication table which is stored by the storage circuit. The microcontroller 202a and the input/output circuit 201a are an example of a circuit for sending a challenge obtained from the authentication table to an authentication-target apparatus. The microcontroller 202a and the input/output circuit 201a are an example of a circuit for receiving, from an authentication-target apparatus, a response with respect to a challenge. The microcontroller 202a is an example of a circuit for obtaining, from an authentication table, a response that corresponds to a pair of identification information of a key table that is received from an authentication-target apparatus, and identification information of the authentication table which is stored by the storage circuit. The comparator 204 is an example of a circuit for authenticating an authentication-target apparatus based on a response received from the authentication-target apparatus and a response obtained from an authentication table. In this way, after the identification information of the key table is sent, the identification information of the authentication table is sent. Accordingly, when the identification information of the key table is sent, the identification information of the authentication table is unclear. Accordingly, an attacker must expose all keys from one key table, and forgery of an authentication-target apparatus is more difficult that in the past.

As illustrated by FIG. 4 and FIG. 5, identification information of a key table 207 may correspond to one column number in the key matrix 400 in which a plurality of keys are arranged in a matrix form. The identification information of an authentication table 208 may correspond to one row number in the key matrix 400. A key table 207 may store m keys which are saved in one column in the key matrix 400, the column being indicated by the identification information of the key table 207. In this way, m keys are saved in this key table 207. Accordingly, it is difficult to expose all keys. In particular, if the authentication-target apparatus is implemented in a tamper-resistant chip, the tamper-resistant chip will break if there is an attempt to extract a key. Accordingly, it is difficult to expose all keys. In other words, forgery of an authentication-target apparatus is difficult. Hypothetically, even if an authentication table stored in an authentication apparatus is exposed, it is not possible to forge the key table of an authentication-target apparatus. This is because all keys stored in a key table are necessary to forge the authentication-target apparatus.

An authentication table 208 stores n responses that are generated from n keys and n challenges. Furthermore, the authentication table 208 also stores these n challenges. The n keys are saved in a single row in the key matrix 400, the single row being indicated by the identification information of the authentication table 208. In this way, although the authentication table 208 has n responses, it is difficult to expose all of them. In particular, if the authentication apparatus is implemented in a tamper-resistant chip, the tamper-resistant chip will break if there is an attempt to extract a response. Accordingly, it is difficult to expose all responses. In other words, forgery of an authentication apparatus and an authentication-target apparatus is difficult.

The n challenges may be respectively independent random numbers. In addition, each of the n responses may be calculated by inputting one challenge of the n challenge and one key of the n keys into a one-way function. Here, the one-way function is the same as the function used to generate the response from the key obtained from the key table and the challenge received from the authentication apparatus. Consequently, it is possible to simply compare two responses, and authentication processing should be easy. The one-way function may be a shared key encryption function or a cryptographic hash function.

As described by the second embodiment, configuration may be taken such that the authentication apparatus sends a password to the authentication-target apparatus, the authentication-target apparatus receives the password from the authentication apparatus, and the authentication-target apparatus determines whether the password received from the authentication apparatus is the correct password. If the password received from the authentication apparatus is the correct password, the authentication-target apparatus may generate the response from the key obtained from the key table and the challenge. By this, the security of the authentication system further improves. An authentication apparatus may obtain, from an authentication table, a password that corresponds to a pair of identification information of a key table that is received from an authentication-target apparatus, and identification information of the authentication table which is stored by the authentication apparatus. The authentication-target apparatus may obtain, from a key table, a password corresponding to the pair of the identification information of the key table stored by the authentication-target apparatus and identification information of authentication table received from the authentication apparatus. The authentication-target apparatus may determine whether the password received from the authentication apparatus is a correct password by comparing the password received from the authentication apparatus with the password obtained from the key table.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed calculating systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-069172, filed Mar. 30, 2018 and 2019-042005, filed Mar. 7, 2019, which are hereby incorporated by reference herein in their entirety.

What is claimed is:

1. An authentication system comprising an authentication apparatus and an authentication-target apparatus, wherein the authentication-target apparatus comprises:
a first nonvolatile memory configured to store a key table and key table identification information, the key table identification information corresponding to one column number in a key matrix in which a plurality of keys are arranged in a matrix form, the key table storing m keys that are saved in one column in the key matrix, and the column being indicated by the key table identification information;
a first communication circuit configured to
send the key table identification information stored by the first nonvolatile memory to the authentication apparatus,
receive authentication table identification information of an authentication table stored by the authentication apparatus from the authentication apparatus,
receive, from the authentication apparatus, a challenge corresponding to a pair of the key table identification information and the authentication table identification information, and
send a generated response to the authentication apparatus; and
a first processor configured to:
obtain, from the key table, a key corresponding to the pair of the key table identification information and the authentication table identification information; and
generate the response from the challenge and the key obtained from the key table, and
wherein the authentication apparatus comprises:
a second communication circuit configured to receive the key table identification information from the authentication-target apparatus;
a second nonvolatile memory configured to store the authentication table and the authentication table identification information, the authentication table storing n challenges and n responses that are generated from the n challenges and n keys that are saved in one row in the key matrix, the one row being indicated by the authentication table identification information; and
a second processor,
wherein the communication circuit is further configured to send the authentication table identification information stored by the second nonvolatile memory to the authentication-target apparatus,
the second processor is further configured to obtain, from the authentication table, the challenge corresponding to a pair of the key table identification information received from the authentication-target apparatus and the authentication table identification information stored by the second nonvolatile memory,
the second communication circuit is further configured to send the challenge obtained from the authentication table to the authentication-target apparatus, and receive the response to the challenge from the authentication-target apparatus,
the second processor is further configured to obtain, from the authentication table, the response corresponding to the pair of the key table identification information received from the authentication-target apparatus and the authentication table identification information stored by the second nonvolatile memory, and authenticate the authentication-target apparatus based on the response received from the authentication-target apparatus and the response obtained from the authentication table.

2. The method according to claim 1, wherein
the n challenges are respectively independent random numbers.

3. The authentication system according to claim 2, wherein
each of the n responses is calculated by inputting a corresponding challenge from among the n challenges and a corresponding key from among the n keys into a one-way function, and
the one-way function is the same as the function used to generate the response from the key obtained from the key table and the challenge received from the authentication apparatus.

4. The authentication system according to claim 3, wherein
the one-way function is a shared key encryption function or a cryptographic hash function.

5. The authentication system according to claim 1, further wherein
the authentication-target apparatus is further configured to:
send a password to the authentication apparatus;
receive the password from the authentication apparatus; and
determine whether the password received from the authentication apparatus is a correct password,
wherein, if the password received from the authentication apparatus is a correct password, the authentication-target apparatus generates the response from the key obtained from the key table and the challenge.

6. The authentication system according to claim 5, wherein:
the authentication apparatus is further configured to obtain, from the authentication table, a password corresponding to the pair of the key table identification information received from the authentication-target apparatus and the authentication table identification information stored by the authentication apparatus.

7. The authentication system according to claim 5, wherein
the authentication-target apparatus is further configured to:
obtain, from the key table, a password corresponding to the pair of the key table identification information stored by the authentication-target apparatus and the authentication table identification information received from the authentication apparatus; and
determine whether the password received from the authentication apparatus is a correct password by comparing the password received from the authentication apparatus with a password obtained from the key table.

\* \* \* \* \*